US012643131B2

(12) United States Patent
Bernard et al.

(10) Patent No.: US 12,643,131 B2
(45) Date of Patent: Jun. 2, 2026

(54) METHOD AND CLEANING DEVICE FOR CLEANING THE INTERIOR OF PIPES

(71) Applicant: LOBBE Industrieservice Gmbh & Co KG, Iserlohn (DE)

(72) Inventors: Adrian Bernard, Iserlohn (DE); Bodo Skaletz, Dinslaken (DE); Reinhard Eisermann, Iserlohn (DE)

(73) Assignee: LOBBE INDUSTRIESERVICE GMBH & CO KG, Iserlohn (DE)

( * ) Notice: Subject to any disclaimer, the term of this patent is extended or adjusted under 35 U.S.C. 154(b) by 156 days.

(21) Appl. No.: 18/815,198

(22) Filed: Aug. 26, 2024

(65) Prior Publication Data

US 2024/0416397 A1 Dec. 19, 2024

Related U.S. Application Data

(62) Division of application No. 18/263,365, filed as application No. PCT/EP2022/051837 on Jan. 27, 2022, now Pat. No. 12,246,363.

(30) Foreign Application Priority Data

Feb. 3, 2021 (DE) ........................ 102021102410.2

(51) Int. Cl.
*B08B 9/049* (2006.01)
*B08B 9/032* (2006.01)

(52) U.S. Cl.
CPC ............ *B08B 9/049* (2013.01); *B08B 9/0325* (2013.01)

(58) Field of Classification Search
None
See application file for complete search history.

(56) References Cited

U.S. PATENT DOCUMENTS

| | | | |
|---|---|---|---|
| 5,322,080 | A | 6/1994 | Rankin |
| 8,048,234 | B2 | 11/2011 | Jacquinet |
| 2004/0069331 | A1 | 4/2004 | Garman et al. |
| 2017/0016687 | A1 | 1/2017 | Eisermann |
| 2018/0372432 | A1 | 12/2018 | Watkins |
| 2024/0093953 | A1 | 3/2024 | Bernard |

FOREIGN PATENT DOCUMENTS

| | | | |
|---|---|---|---|
| DE | 1251259 | B | 10/1967 |
| DE | 69309524 | T2 | 7/1997 |
| KR | 10-2010-0086849 | A | 8/2010 |
| WO | 2015144889 | A1 | 10/2015 |

*Primary Examiner* — Rita P Adhlakha

(74) *Attorney, Agent, or Firm* — Hudak, Shunk & Farine Co. LPA

(57) ABSTRACT

A method for cleaning the interior of pipes using a cleaning device and a cleaning device. The cleaning device has a tube and an advancing unit for moving the tube along a main axis (H) of the advancing unit. The advancing unit has a drive which is frictionally connected to the tube and by which the tube is moved in an axial direction along the main axis (H). The advancing unit is set into a rotational movement about the main axis (H) during the axial movement of the tube, and the drive transmits the rotational movement to the tube.

14 Claims, 4 Drawing Sheets

METHOD AND CLEANING DEVICE FOR CLEANING THE INTERIOR OF PIPES

FIELD OF THE INVENTION

The present invention relates to a method for cleaning the interior of pipes, in particular pipes having front-facing open ends, and to a cleaning device.

BACKGROUND OF THE INVENTION

Pipes with front-facing open ends are used in heat exchangers, condensers and air coolers, for example. There, the pipes can be grouped into so-called pipe bundles. In operation, the pipe ends are connected to a circuit through which a medium, for example a coolant, is directed. From time to time, the pipes will need to be cleaned, because deposits and/or soiling will form within the pipes, typically originating from the media directed through the pipes. If the deposits are too large, sufficient medium can no longer be passed through the pipes, or a pipe is clogged completely.

Methods and devices for cleaning the interior of pipes with front-facing open ends are already known from the prior art.

For example, WO 2015/144889 A1 discloses a method and a device for cleaning bundles of pipes in which a cleaning device with a cleaning unit is provided. The cleaning unit has a high-pressure tube that is pushed into a pipe using an advancing unit. The advancing unit has a drive roller and a pressing roller for this purpose. The high-pressure tube (HP tube) has a nozzle at its front end. Liquid is passed through the tube under high pressure and flows out of openings of the nozzle, which can remove contaminants in the pipe.

The liquid flowing out of the openings of the nozzle in the form of jets pulverises the contaminants and releases them from the inside of the pipe. The geometry and arrangement of the openings on the nozzle have a major impact on the cleaning performance of a cleaning device. On the one hand, it is advantageous when the jets are as narrow as possible and only have a small fanning effect, i.e. have a low opening angle. This maximises the pressure of the jet, thereby improving the cleaning performance at the point where the jet hits. On the other hand, the cleaned surface is very small with a narrow jet. In extreme cases, this can result in the jets milling ridges into the contaminants by advancing the nozzle, wherein however contaminants remain between the ridges. The device according to WO 2015/144889 A1 cannot solve this problem.

U.S. Pat. No. 8,048,234 B2 discloses a cleaning device for pipes having a tube. The tube is moved in the axial direction by an advancing unit. Rollers that are frictionally connected to the tube are provided for this purpose. The advancing unit is arranged in a rotatable housing, which is rotated about the main axis by a motor via a transmission.

In DE 693 09 524 T2, a device for duct cleaning is disclosed, which consists essentially of a movable unit equipped with a compressed air expulsion nozzle.

US 2004/0069331 A1 discloses an assembly for rotating and axially aligning a high-pressure hose and a spray head to remove residues from the bores of heat transfer tubes. A placing arm is provided among other things, which stacks the hose in uniform layers on a hose reel.

In addition, there are so-called rotary nozzles that rotate, driven by the liquid, and thus better cover the inner surface of the pipes. However, rotary nozzles are expensive to buy and also sensitive. In addition, known rotary nozzles often rotate at several thousand revolutions per minute. Due to these high speeds, the water jet does not strike perpendicularly. Rather, the high speeds cause the water to swirl around the nozzle several times and then virtually tangentially strike the contaminants, which can make the water jet energy insufficient to remove the contaminants. Also, such high speeds are often not necessary for pipe cleaning of heat exchangers in the industrial field. There also exist oil-braking rotary nozzles at lower speeds. However, with such nozzles, energy is lost through oil braking, thereby decreasing the cleaning performance. The cleaning result of such nozzles is therefore not satisfactory. The use of commercially available rotary nozzles is thus generally unsatisfactory.

SUMMARY OF THE INVENTION

The problem addressed by the invention was therefore to provide a cost-effective improvement of the cleaning performance in methods and devices for cleaning of pipes with front-facing open ends.

This problem is solved by a method for cleaning the interior of pipes using a cleaning device wherein the cleaning device has a tube and an advancing unit for moving the tube along a main axis (H) of the advancing unit, wherein the advancing unit has a drive which is frictionally connected to the tube and by which the tube is moved in an axial direction along the main axis (H), wherein the advancing unit is set into a pendulum movement about the main axis (H) during the axial movement of the tube, wherein the drive transmits the pendulum movement to the tube.

The cleaning device has a tube and an advancing unit for moving the tube along a main axis H of the advancing unit, wherein the advancing unit has a drive that is frictionally connected to the tube and by means of which the tube is axially moved along the main axis H. The advancing unit is set into a rotational movement about the main axis H during the axial movement of the tube, wherein the drive transmits the rotational movement to the tube and wherein the rotational movement of the advancing unit is a pendulum movement.

A tube differs from a cleaning lance primarily due to its elasticity, which allows non-straight pipes to also be cleaned. A cleaning lance is rigid. Only straight pipes can be cleaned with a cleaning lance. The tube is preferably an HP tube. Preferably, the tube is at least partially made of a plastic, in particular an elastomer. The tube can have a reinforcement insert, in particular a wire insert. It is particularly advantageous for the tube to be at least partially made from rubber.

The tube is preferably connected to a source for a cleaning medium, in particular a source that provides water at high pressures of up to 3000 bar.

Preferably, at a front end of the pipe, a nozzle having one or more cleaning medium exit holes is provided.

With cleaning devices known from the prior art, the ridge formation described above results in an insufficient cleaning outcome. Cleaning medium exiting the nozzles flows out of the pipe in an axial direction due to the pressure prevailing in the pipe, in particular counter to the advancing direction of the cleaning device. The cleaning medium can drain off in ridges running parallel to the main axis H almost without resistance.

By the rotational movement about the main axis H, ridges running parallel to the main axis are avoided. Rather, the exit holes of a nozzle attached to the front of the tube move on curved paths. If the axial and rotational speeds are correctly selected, there are no longer any ridges with the invention, because the entire inner surface of the pipe is exposed to water. In addition, a nozzle carrier with various nozzle plugs can be used, which results in additional overlapping of the paths so that the inner surface is cleaned even more thoroughly.

The rotational movement results in a larger surface region on the inside of a pipe being covered by the water jet at the same time. By contrast to rotary nozzles, it can be ensured by the use of nozzles with exit openings perpendicular to the advancing direction that the water jet strikes the soiling perpendicularly, i.e. with maximum energy. This improves the cleaning performance.

As described above, pipes having bends can also be cleaned with a tube. It has been shown that the pendulum movement additionally helps the tube to pass through a bent portion. As a result, even very narrow bends and portions behind them can be cleaned with the device according to the invention.

The cleaning pattern can be influenced by a change in the rotational and axial movement and can thus be adjusted to each specific pipe to be cleaned or its soiling. In this way, a wide range of soiling levels can be covered with one and the same cleaning device and even one and the same nozzle. Thus, highly soiled pipes can be cleaned particularly thoroughly, or strongly adhered soil can be removed, using a “close-mesh” cleaning pattern, whereas lightly soiled pipes can be cleaned faster on the basis of a “broad-mesh” cleaning pattern, or less strongly adhered soil can be removed more quickly but just as thoroughly. In both cases, only as much working time, cleaning medium and energy is used for cleaning as is needed. In addition, with a rotation, it can be ruled out that the jet of cleaning medium exiting the nozzle is guided along the same axial line multiple times during insertion and withdrawal of the tube, thereby reducing the risk of damage to the wall of the pipe.

The rotational movement can in principle be effected manually. For this purpose, the cleaning personnel can rotate the advancing unit manually about the main axis H. As usual, the tube is rotated by the frictional connection. The cleaning personnel can thereby directly influence, vary and thus directly control the movement of the tube. However, a manual rotation is less preferred for reasons of occupational safety. Rather, an at least a semi-automated or even a fully automated rotational movement is preferably provided. For this purpose, the cleaning device preferably has a rotational drive and a controller. A semi-automated or fully automated rotational movement results in a reproducible cleaning outcome.

For example, in a semi-automated rotational movement, it can be provided that the rotational drive performs the rotational movement, wherein the cleaning personnel can start and stop the rotational movement at their convenience during the cleaning process by means of the controller. Alternatively, a dead man’s switch can be provided in the case of semi-automated rotational movement. The cleaning process only runs for as long as the dead man’s switch is pressed. If the dead man’s switch is released, preferably the source of the water pressure is turned off, the drive is stopped and the rotational movement is stopped.

In the case of fully automated rotational movement, the cleaning personnel merely triggers the start of the cleaning process, and the cleaning device performs the cleaning process independently by means of the controller.

The axial movement of the tube or activation of the drive is also preferably semi- or fully automated. Together with the automation of the rotational movement, the cleaning pattern is then predefinable, so that the cleaning device can be specifically adjusted to different pipes and/or different levels of soiling.

Preferably, the rotational movement of the advancing unit is a pendulum movement. A pendulum movement is understood to mean a rotational movement with two defined end positions, between which the advancing unit is repeatedly moved back and forth. Compared to a continuous rotational movement, a pendulum movement has the advantage that the tube is not twisted, because such a stress can lead to damage to the tube. Preferably, the pendulum movement between the two end positions takes place at an angle of $\phi \leq 360°$. The two end positions of the advancing unit are identical in the case of $\phi=360$. Depending on the type of nozzle used, an angle of $\phi \leq 270°$ can also be sufficient, thereby reducing the strain on the tube.

A pressure drop arises in the tube depending on the travel distance, which adversely affects the cleaning result. The volume of cleaning medium that can be conveyed through the tube is further limited. The pressure and thus the kinetic energy of the exiting cleaning medium decreases with an increasing number of exit holes. Particularly preferably, the nozzle therefore has two exit holes offset by 180° about the main axis H, i.e. opposing exit holes. The rotational angle of the pendulum movement is preferably selected as a function of the number of exit holes. In the case of a nozzle with two exit holes, the pendulum movement preferably occurs between the two end positions at an angle of $\phi \geq 180°$. The device according to the invention thus offers the particular advantage that a nozzle with few exit holes can be selected, whereby the cleaning medium strikes the soiling with a higher kinetic energy, and nevertheless a larger surface region can be exposed to water. This leads to a substantial improvement in the cleaning efficiency.

In advantageous further developments, a starting position is provided for the pendulum movement, in which the centre of gravity of the advancing unit lies directly below the main axis H, wherein the pendulum movement is performed symmetrically about the starting position. From the starting position, the advancing unit is then rotated alternately $\phi/2$ in both rotational directions and back. The centre of gravity directly below the advancing unit favours a return of the advancing unit to the starting position. If the pendulum movement or the cleaning process is ended overall, for example, a motor responsible for pendulum movement can be switched to neutral, whereupon the advancing unit stops.

The rotational movement of the advancing unit and the axial movement of the pipe are preferably coordinated using the controller of the cleaning device. Preferably, certain cleaning programmes for different degrees of soiling can be stored in the controller, which can thus be selected in a simple manner. For example, the cleaning programmes can include certain cleaning patterns and/or drive and rotation speeds.

The problem addressed by the invention is also solved by a cleaning device according to the invention for cleaning the interior of pipes.

The cleaning device has a tube, a post and an advancing unit for moving the tube along a main axis H of the advancing unit, wherein the advancing unit has a drive that is frictionally connected to the tube in order to move the tube axially along the main axis H. The advancing unit is rotatably supported about the main axis H in the post, wherein the tube can be set into a rotational movement by the frictional connection, preferably in a pendulum movement. The advancing unit thus transmits both the axial movement and the rotational movement to the tube. As described above, the combined movement of the tube results in improved cleaning of the interior of pipes.

Preferably, the drive comprises one or more rollers, which are frictionally connected to the tube. A form-fit connection would require a dedicated pipe, which would make the cleaning device more expensive to manufacture. This is avoided by the frictional connection. Preferably, the rollers are respectively rotatably supported in the advancing unit, in particular about an axis of rotation that runs crookedly to the main axis H and in a plane that is arranged perpendicular to the main axis H. Particularly preferably, a plurality of rollers are provided, each of which can be rotated about an axis of rotation, wherein the axes of rotation run parallel to one another. It is considered particularly advantageous when the rollers are arranged oppositely with respect to the tube. The rollers are then pressed to the tube in opposite directions. This clamps the tube between the rollers, increasing frictional traction and reducing slippage. For this purpose, preferably at least one of the two rollers is arranged on an eccentric element. With the eccentric element, the position of this roller and thereby the distance between the rollers can be changed. In this way, the contact pressure can be adjusted and, if necessary, the rollers can be adapted to tubes of different diameters.

Preferably, the drive is automated or semi-automated. Advantageously, the drive for this purpose has a servomotor that drives one or more of the rollers. Preferably, the rollers are coupled together such that only one roller needs to be driven by the servomotor, and all other rollers are driven via the driven roller. A servomotor allows for a precise axial movement of the tube. Particularly preferably, the one roller is driven and the other roller has the eccentric element.

Preferably, the advancing unit has a pinion by means of which the advancing unit can be rotated about the main axis H. The pinion can be connected to and driven by various drives without the need for an adjustment to the advancing unit. The cleaning device is thus less expensive to manufacture and can also be retrofitted to a new drive in a straightforward manner.

To enable semi- or full automation of the rotational movement, the cleaning device preferably has a rotational drive, and particularly preferably a pendulum drive, by means of which the advancing unit can be rotated.

The pendulum drive is a rotary drive configured so as to move the advancing unit in a pendulum movement as described above. With the cleaning device according to the invention, a predefined cleaning pattern can be generated as described above. In advantageous further developments, a controller is provided for this purpose, which is connected to the rotational drive and the drive. The controller allows for a precise activation of the rotational drive and the drive, whereby the axial and rotational movement of the tube is very precisely controllable. In this way, the desired cleaning pattern can be generated when used as intended.

The rotational drive preferably has a motor supported on the post, in particular a pneumatic motor or a servomotor, by means of which the pinion can be rotated. A servomotor is particularly easy to integrate into the controller of the cleaning device, in particular when the drive is automated or semi-automated and has a servomotor. A pneumatic motor is particularly advantageous when there is an air supply at the place of deployment in any case. Unlike a servomotor, a pneumatic motor can also be used in areas where only explosion-proof devices are permitted to be used. The controller is preferably configured so as to shift the rotational drive, in particular the servomotor or the pneumatic motor, alternately in one or the other rotation direction, so that the advancing unit is moved in a pendulum movement, preferably in a pendulum movement between two end positions that are separated from one another by an angle of $\phi \leq 360°$, particularly preferably by an angle of $\phi \leq 270°$.

Alternatively, the rotational drive can have a rack-and-pinion transmission, wherein the rack-and-pinion transmission has the pinion and a rack that can be moved back and forth on the post, and wherein a linear movement of the rack is converted into a rotation of the pinion and thus of the advancing unit.

The rack extends along a rack axis Z that runs crookedly to the main axis H and in a plane that is perpendicular to the main axis H. The rack and pinion are in direct contact. As a result, no further transmission components are required in addition to the rack and pinion, which simplifies the construction of the rotational drive. Together with the pinion, the rack forms a transmission that moves the advancing unit in a pendulum movement, preferably a pendulum movement between two end positions that are separated from one another by an angle of $\phi \leq 360°$, particularly preferably by an angle of $\phi \leq 270°$.

The rack is preferably linearly movable by two single-acting lift cylinders or by means of a double-acting lift cylinder, each of which are components of the rotational drive, wherein the lift cylinder(s) are supported on the post. Pneumatically operated lift cylinders have proven particularly advantageous in this respect, because they are low-maintenance despite the soiling occurring due to the leakage of the dissolved deposits from the pipe.

The tube is under high pressure during operation. As a result, and due to the axial and rotational movement of the tube, portions of the tube that are not in the pipe to be cleaned also move. For reasons of occupational safety, the advancing unit advantageously has a tube guide, which can guide the tube at least in sections. The tube guide also facilitates the alignment of the tube with the pipe to be cleaned. To ensure that the drive can still be frictionally connected to the pipe, it is preferably provided that the tube guide is interrupted in the region of the drive. In this way, the drive can be frictionally connected to the tube while the tube is guided in front of and behind the drive.

The rotary drive is preferably arranged in a front region of the cleaning device, wherein the front region faces the pipe to be cleaned when used as intended.

A combination of a cleaning device according to the above description and a pipe to be cleaned, which extends along the main axis H, is further disclosed.

The method according to the invention is preferably carried out using the cleaning device according to the invention.

BRIEF DESCRIPTION OF THE DRAWINGS

The invention is exemplified in the drawings. Shown are.

DETAILED DESCRIPTION OF THE INVENTION

Figure 1:
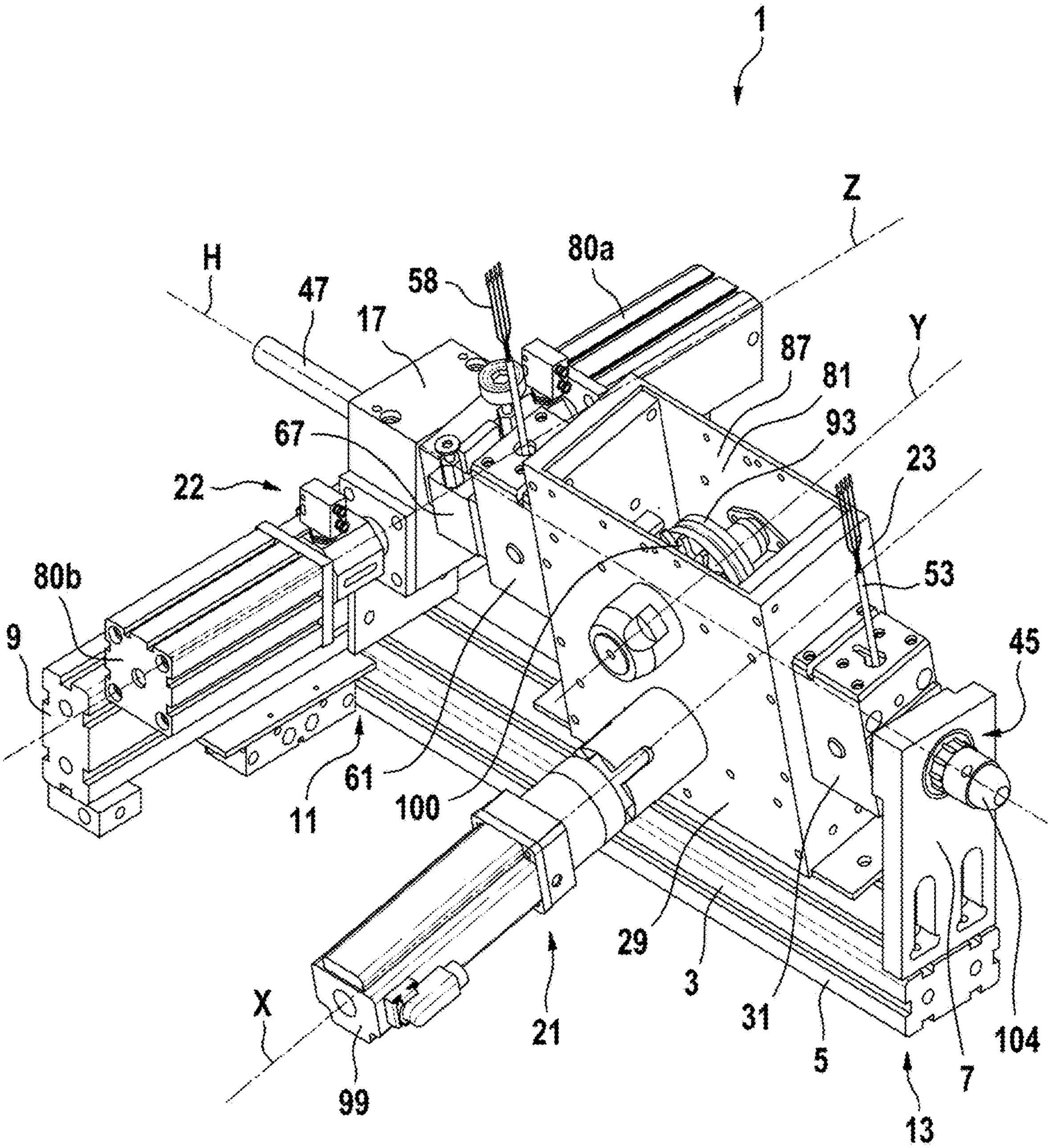
FIG. 1 a perspective view of a first embodiment of a device according to the present invention.
Figure 2:
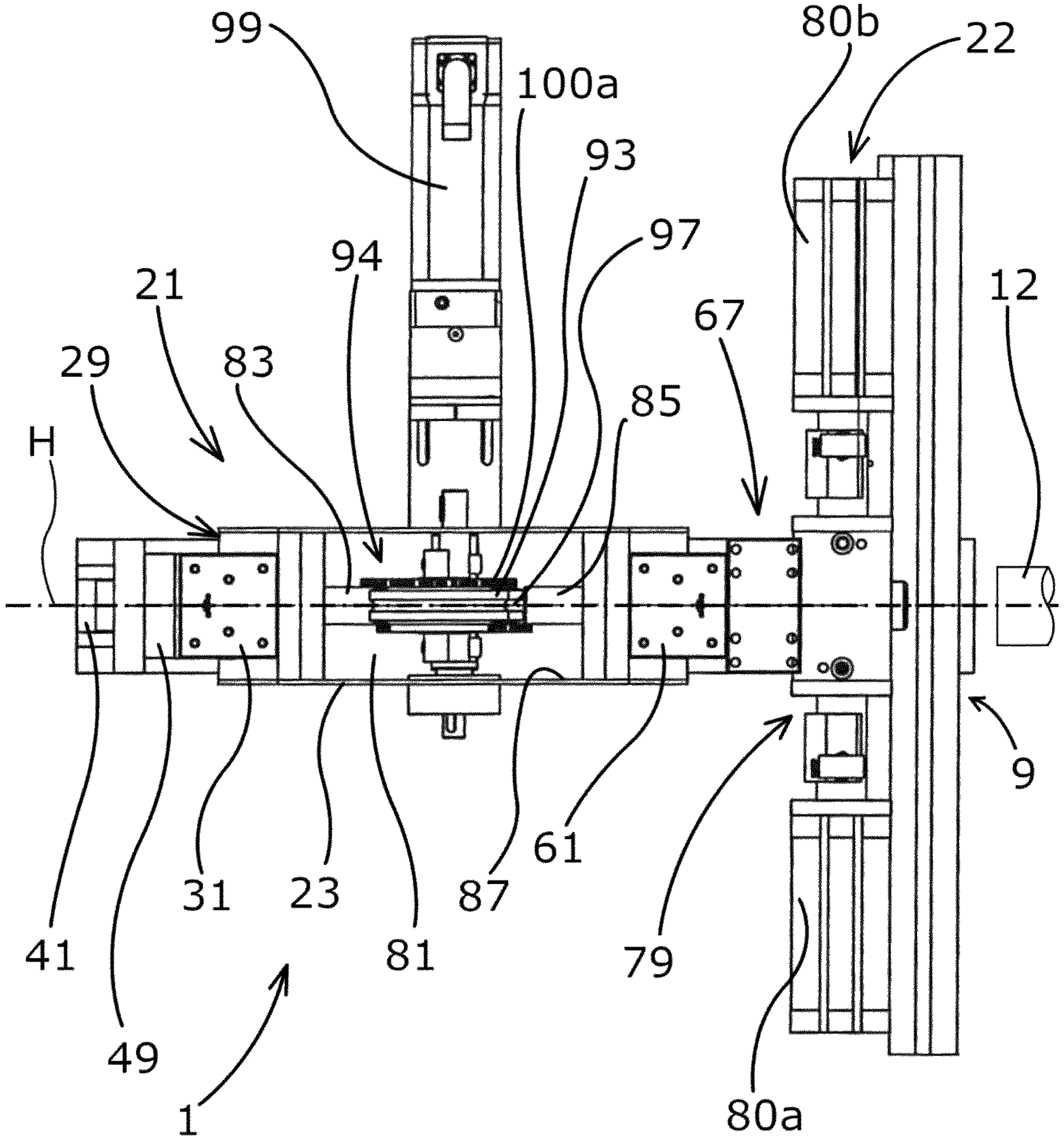
FIG. 2 a plan view of the device according to FIG. 1.
Figure 3:
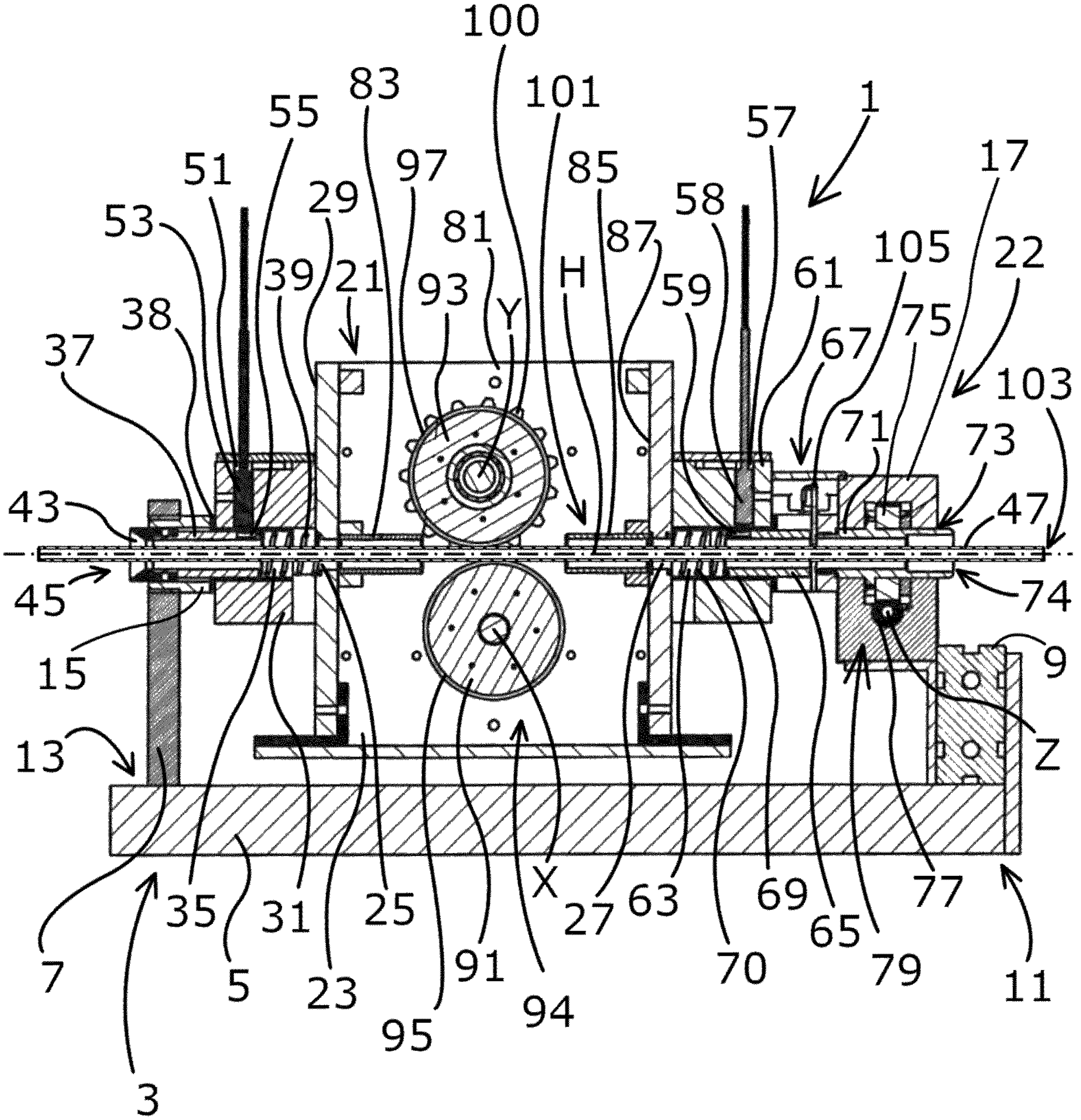
FIG. 3 a vertical section in the longitudinal direction through the device according to FIG. 1.

The cleaning device 1 shown in FIGS. 1 to 3 has a post 3 having a base 5, a pillar 7 and a bracket 9 (see FIG. 1). The pillar 7 and the bracket 9 are arranged along a main axis H on the base 5, wherein the bracket 9 is arranged in a front region 11 of the base 5 and the pillar 7 is arranged in a rear region 13 of the base 5. When used as intended, the front region 11 faces the pipe 12 to be cleaned and the rear region 13 faces away from the pipe 12 (see FIG. 2).

A plastic bushing 15 is arranged in the pillar 7. The bracket 9 comprises a plastic block 17. The cleaning device 1 further has an advancing unit 21, which is supported in the plastic bushing 15 and the plastic block 17 and thereby rotatably supported in the post 3 about the main axis H. The cleaning device 1 further has a rotational drive 22 by means of which the advancing unit 21 can be rotated.

The advancing unit 21 has a central housing 23 with two coaxial apertures 25, 27 along the main axis H (see FIG. 3). A first guide block 31 is arranged on the outside 29 of the housing 23 and behind the first aperture 25 and is fixedly connected to the housing 23. The first guide block 31 has a first guide bore 35 coaxial to the first aperture 25. A first hollow shaft 37 is arranged in the first guide bore 35. The first hollow shaft 37 is guided in a first bushing 38 such that it is axially displaceable relative to the first guide block 31. A first compression spring 39 is arranged between the first hollow shaft 37 and the outside 29 of the housing 23. The first hollow shaft 37 is rotatably supported in the plastic bushing 15 about the main axis H.

The first hollow shaft 37 has a partially conical bore 43 running along the main axis H, which transitions into a cylindrical bore of the hollow shaft 37 and whose largest inner diameter is provided at one end 45. The conical bore 43 thereby facilitates insertion of a tube 47 into the first hollow shaft 37. The first hollow shaft 37 is thus chamfered by the conical bore 43, thereby avoiding damage to the pipe.

A first sensor bore 51, which is arranged perpendicular to the first guide bore 35 and in which a first sensor 53 is arranged, is provided in the first guide block 31. The first hollow shaft 37 has a first recess 55 that cooperates with the first sensor 53. In the illustrated position, the first compression spring 39 is unstressed and the first sensor 53 is aimed at the first recess 55.

A second guide block 61 is arranged on the outside 29 of the housing 23 and in front of the second aperture 27, which is fixedly connected to the housing 23 on the one hand and to a spacer 67 on the other hand. The second guide block 61 has a second guide bore 63 that runs coaxially to the second aperture 27. A second bushing 69 is arranged in the second guide bore 63, in which a second hollow shaft 65 is arranged axially displaceable relative to the second guide block 61. In the axial direction, a second compression spring 70 is arranged between the second hollow shaft 65 and the outer side 29 of the housing 23.

A second sensor bore 57, arranged perpendicular to the second guide bore 63, in which a second sensor 58 is arranged, is provided in the second guide block 61. The second hollow shaft 65 has a second recess 59. The second sensor 58 is aimed at the second recess 59 in the illustrated position of the second hollow shaft 65, and the second compression spring 70 is relaxed.

The recesses 55, 59 are located on the outsides of the first and second hollow shafts 37, 65. Thus, they are not in direct contact with the space in which the tube is located. The risk of the recesses 55, 59 becoming soiled is thereby reduced. In other embodiments, a continuous bore having a small diameter can be respectively provided in the recesses 55, 59. Thus, for example, water that collects in recesses 55, 59 can drain.

A third hollow shaft 71 running along the main axis H is connected to the spacer 67 in a rotationally fixed manner and projects out of the spacer 67 on the side of the spacer 67 facing away from the second guide block 61.

The third hollow shaft 71 extends outside the spacer 67 through a bore 73 of the plastic block 17 and projects out of the bore 73 with an end 74 on the side of the plastic block 17 facing away from the spacer 67. The third hollow shaft 71 is supported in the plastic block 17 such that it can be rotated relative to the bracket 9 about the main axis H.

Inside the plastic block 17, a pinion 75 is arranged in a rotation-proof manner on the third hollow shaft 71. The pinion 75 together with a rack 77 of the post 3 running crookedly relative to the main axis H along a rack axis Z forms a rack-and-pinion transmission 79 of the rotational drive 22, wherein the rack axis Z runs in a plane that is perpendicular to the main axis H. The rack 77 is moved back and forth from two opposed, single-acting, compressed air-powered lift cylinders 80*a*, 80*b* of the rotational drive 22 (see FIG. 2). In FIG. 1, the advancing unit 21 is rotated at an angle of about 15° about the main axis H compared to the illustration of FIG. 2.

In FIG. 1, the advancing unit 21 is shown in an end position. If the rack 77 is moved axially by the lift cylinders 80*a*, 80*b*, the pinion 75 and thus the third hollow shaft 71 are rotated about the main axis H. The spacer 67 also rotates, because it is connected to the third hollow shaft 71. The second hollow shaft 65 and the second guide block 61 as well as the housing 23 fixedly connected to the second guide block 61 are further rotated via the spacer 67. The same applies to the first guide block 31 connected to the housing 23 and the first hollow shaft 37 and the plastic bushing 15. In this way, the entire advancing unit 21 can be rotated relative to the post 3 about the main axis H. The lift cylinders 80*a*, 80*b* alternately retract and extend. This moves the advancing unit 21 in a pendulum movement.

In the interior 81 of the housing 23, two guide sleeves 83, 85 are arranged for the tube 47 (see FIG. 3). The first guide sleeve 83 is arranged on the inside 87 of the housing 23 adjacent to the first aperture 25 such that its bore transitions into the first aperture 25. The second guide sleeve 85 is arranged on the inside adjacent to the second aperture 27 such that its bore transitions into the second aperture 27. Both guide sleeves 83, 85 run coaxially to the main axis H.

In order to move the tube 47 axially, the advancing unit 21 has a drive roller 91 and a pressing roller 93 in the interior 81 of the housing 23. The rollers 91, 93 are each rotatable about an axis of rotation X, Y extending crookedly relative to the main axis H, wherein the axes of rotation X, Y each extend in a plane that is perpendicular to the main axis H. Both rollers 91, 93 have a respective circumferential groove 95, 97 extending at the respective outer circumference in which the tube 47 is received when used as intended. The rollers 91, 93 are rubberised in the region of the grooves 95, 97 and move the tube 47 by means of frictional connection. The distance between the rotational axes X, Y can be adjusted by way of an eccentric element (not shown) of the pressing roller 93 so that the contact pressure can be adjusted and/or tubes of different diameters can be moved by the advancing unit 21.

The rollers 91, 93 are part of a drive 94 of the advancing unit 21. The drive 94 further has a servomotor 99 that directly drives the drive roller 91. The rollers 91, 93 are coupled together via pinions 100 (only one pinion is shown) such that the pressing roller 93 is also driven.

The hollow shafts 37, 65, 71, the housing 23 and the guide sleeves 83, 85 together form a tube guide 101 for the tube

47. Starting from the end 45, the tube 47 extends sequentially through the first hollow shaft 37, through the first compression spring 39, through the first aperture 25, through the first guide sleeve 83, through the interior 81 of the housing 23, through the second guide sleeve 85, through the second aperture 27, through the second compression spring 70, through the second hollow shaft 65 and through the third hollow shaft 71. At the end 74 of the third hollow shaft 71, the tube 47 enters the open air and, when used as intended, is guided there into a pipe 12 to be cleaned. The cleaning device 1 is positioned such that the pipe 12 to be cleaned runs along the main axis H (see FIG. 2).

Between the guide sleeves 83, 85, the tube guide 101 is interrupted so that the rollers 91, 93 can contact the tube 47 and move it axially. The rollers 91, 93 clamp the tube 47 between their circumferential grooves 95, 97 and are thereby frictionally connected to the tube 47. A rotation of the drive roller 91 thus results in axial movement of the tube 47 in the tube guide 101 along the main axis H.

When used as intended, the tube 47 is moved axially by way of the drive 94, and at the same time the advancing unit 21 is moved in a pendulum movement about the main axis H using the lifting cylinders 80*a*, 80*b*. Due to the frictional connection between the rollers 91, 93 and the tube 47, the pendulum movement of the advancing unit is transferred to the tube 47, so that the tube 47 is also rotated about the main axis H.

A nozzle (not shown) is attached to the tip 103 of the tube 47. The nozzle has a larger cross-section than the tube 47. The nozzle arranged at the tip of the tube 47 has eccentrically arranged exit holes for cleaning water. The simultaneous rotational and axial movement of the tube 47 causes the exit holes to move on curved paths, for example, creating a predefined cleaning pattern on the insides of the pipe 12. The curved webs more fully clean the insides of the pipe 12 compared to a pure axial movement of the tube 47. The cleaning pattern can be influenced by a change in the rotational and axial movement and can thus be adjusted to each specific pipe to be cleaned or the respective degree of soiling and/or the type of soiling in each case. In this way, a wide range of soiling levels can be covered with one and the same cleaning device. Thus, highly soiled pipes can be cleaned particularly thoroughly, or strongly adhered soil can be removed, using a “close-mesh” cleaning pattern, whereas lightly soiled pipes can be cleaned faster on the basis of a “broad-mesh” cleaning pattern, or less strongly adhered soil can be removed more quickly but just as thoroughly, whereby only as much working time, cleaning medium and energy is used as is required for the cleaning.

A spherical stopper element 104 can be attached to the region of the tube 47 that lies in front of the first hollow shaft 37. To create redundancy, a plurality of stopper elements 104 can also be provided. The stopper element 104 acts as an end stop for the axial movement of the tube 47. If the tube 47 is moved along the main axis H to a target depth into the pipe 12 to be cleaned and such a stopper element 104 is positioned at the appropriate position on the tube 47, the stopper element 104 abuts the first hollow shaft 37 and pushes the first hollow shaft 37 in the axial direction against the first compression spring 39 (see FIG. 3). The first compression spring 39 is thereby compressed and the first recess 55 is moved away from the first sensor 53. The first sensor 53 registers this movement, because it is now aimed directly at the peripheral surface of the first hollow shaft 37. A controller of the cleaning device 1 receives the signal from the first sensor 53 and stops the servomotor 99 such that the tube 47 is not moved further into the pipe 12.

When the cleaning device 1 is put into service, the tube 47 is manually moved from the first hollow shaft 37 through the tube guide 101 until the tube 47 enters the open air at the end 74 of the third hollow shaft 71. From there, it can be moved into the pipe 12 and can clean its inside.

If the tube 47 is moved out of the pipe 12 after a cleaning operation, it should only be moved back to a predetermined point by the drive 94. In particular, it should be prevented that the tube 47 falls completely out of the advancing unit 21. For this purpose, the tube guide 101 in the region of the spacer 67 is interrupted. A fork-shaped stopper part 105 can be stuck on the tube 47 in the spacer 67. The stopper part 105 is then secured by a cover of the spacer 67, which prevents the stopper part 105 from slipping off the tube 47. The stopper part 105 has a clear width that is greater than the outer diameter of the tube 47, but less than the outer diameter of the nozzle. When the tube 47 retracts out of the pipe 12, the nozzle abuts against the stopper part 105. The stopper part 105 is thereby pushed in the axial direction against the second hollow shaft 65 and moves the second hollow shaft 65 axially towards the housing 23 against the force of the second compression spring 70. In this way, the second sensor aperture 57 is moved away from the second sensor 58. The second sensor 58 registers this movement, because it is now no longer aimed at the second recess 59, but directly towards the outer peripheral surface of the second hollow shaft 65. The controller senses the movement of the second hollow shaft 65 using the second sensor 58 and stops the servomotor 99 such that the tube 47 is not moved further.

In other embodiments, a second fork-shaped stopper part can be provided between the inside 87 and the second guide block 61. This creates redundancy. The second fork-shaped stopper part can also be configured merely as a tube catcher and not a switch. As a result, no additional sensor is required, and the second fork-shaped stopper part still serves as an additional safety in order to prevent the tube from exiting the tube guide under pressure.

Figure 4:
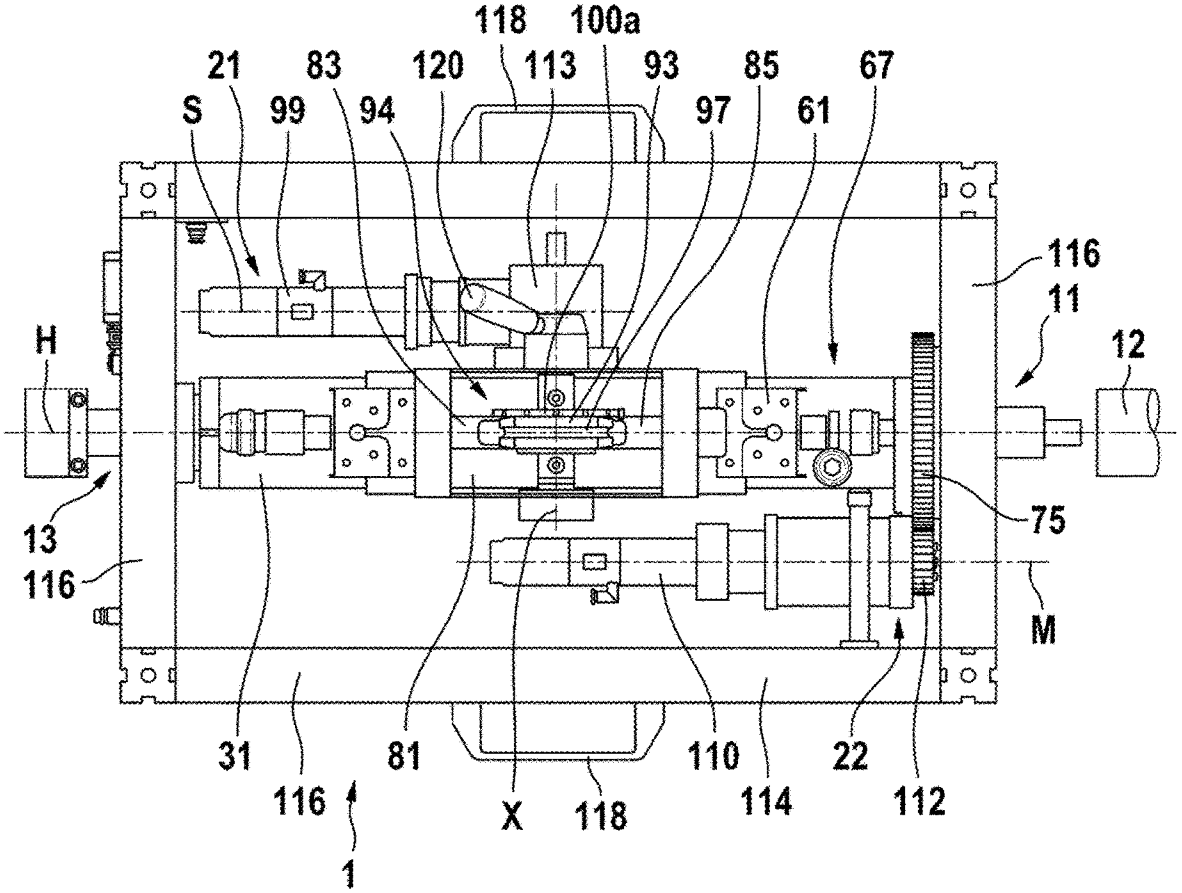
FIG. 4 a second embodiment of the device according to the invention in a plan view.

FIG. 4 shows a second embodiment of the cleaning device 1 according to the invention. This embodiment corresponds in portions to the first embodiment, but deviates from the first embodiment in particular with respect to the rotational drive 22. The rotational drive 22 further provides a pinion 75 that can be rotated about the main axis H with respect to the post but is fixedly connected to the advancing unit 21. A rotation of the pinion 75 thus further results in a similar rotation of the advancing unit 21 in the post 3.

For the rotational movement, in this embodiment, a pneumatic motor 110 is provided, being supported on the post. The motor 110 drives a spur gear 112 engaged with the pinion 75. Thus, a rotation of the motor 110 about its motor axis M aligned parallel to the main axis H results in a rotation of the spur gear 112, the pinion 75 and ultimately the advancing unit 21.

In this embodiment, the servomotor 99 is arranged on the advancing unit 21 such that its servomotor axis S is perpendicular to the axis of rotation of the drive roller (neither are visible here). More specifically, in this embodiment, the servomotor axis S of the drive is aligned parallel to the main axis H, like the motor axis M of the rotational drive. This gives the cleaning device a compact design. The servomotor 99 includes a transmission 113 for redirecting the drive torque from the servomotor 99 to the drive roller 91.

In this embodiment, the post of the cleaning device 1 is built into a frame construction 114. The frame construction 114 is cuboid and has a plurality of frame portions 116. The frame portions 116 run along the edges of an intended cuboid.

In the front region 11 and the rear region 13, the frame construction 114 is closed at its front sides by a respective plate. In the front region 11, this prevents soil from the pipe 12 reaching the pneumatic motor 110 or other components. Two carrying handles 118 are arranged on opposite sides of the frame construction 114.

The distance between the axis of rotation of the drive roller and the axis of rotation X of the pressing roller 93 can be adjusted by way of an eccentric element with a handle 120. With the eccentric element 120, the pressing roller 93 is moved with its axis of rotation X relative to the axis of rotation of the drive roller. In this way, the contact pressure can be adjusted, and/or tubes having different diameters can be moved through the advancing unit 21.

LIST OF REFERENCE NUMERALS

1 Cleaning device
3 Post
5 Base
7 Pillar
9 Bracket
11 Front region
12 Tube
13 Rear region
15 Plastic bushing
17 Plastic block
21 Advancing unit
22 Rotational drive
23 Housing
25 First aperture
27 Second aperture
29 Outside
31 First guide block
35 First guide bore
37 First hollow shaft
38 First bushing
39 First compression spring
43 Bore
45 End
47 Tube
51 First sensor bore
53 First sensor
55 First recess
57 Second sensor bore
58 Second sensor
59 Second recess
61 Second guide block
63 Second guide bore
65 Second hollow shaft
67 Spacer
69 Second bushing
70 Second compression spring
71 Third hollow shaft
73 Bore
74 End
75 Pinion
77 Rack
79 Rack-and-pinion transmission
**80*a*** Lift cylinder
**80*b*** Lift cylinder
81 Interior
83 First guide sleeve
85 Second guide sleeve
87 Inside
91 Drive roller
93 Pressing roller
94 Drive
95 Circumferential groove
97 Circumferential groove
99 Servomotor
100 Pinion
101 Tube guide
103 Tip
104 Stopper element
105 Abutment part
110 Pneumatic motor
112 Spur gear
113 Transmission
114 Frame construction
116 Frame part
118 Handle
120 Eccentric element with handle
H Main axis
M Motor axis
S Servomotor axis
X Axis of rotation
Y Axis of rotation
Z Rack axis

What is claimed is:

1. A cleaning device for cleaning the interior of pipes, comprising:
a tube,
a post and
an advancing unit for moving the tube along a main axis (H) of the advancing unit, wherein the advancing unit has a drive connected to the tube by a frictional connection in order to move the tube axially along the main axis (H),
wherein the advancing unit is rotatably supported about the main axis (H) in the post,
wherein the tube can be set into a pendulum movement by the frictional connection, and
wherein a pendulum drive is provided, by which the advancing unit can be rotated.

2. The cleaning device according to claim 1, wherein the drive comprises one or more rollers, which are frictionally connected to the tube.

3. The cleaning device according to claim 2, wherein the advancing unit has a pinion by which the advancing unit can be rotated about the main axis (H).

4. The cleaning device according to claim 3, wherein a controller is connected to the pendulum drive and the drive.

5. The cleaning device according to claim 4, wherein the pendulum drive has a rack-and-pinion transmission, wherein the rack-and-pinion transmission has the pinion and a rack that can be moved back and forth on the post, and wherein a linear movement of the rack is converted into a rotation of the pinion and thus of the advancing unit by the rack-and-pinion transmission.

6. The cleaning device according to claim 5, wherein the rack can be moved linearly using two single-acting lift cylinders or using a double-acting lift cylinder, wherein the lift cylinder(s) are supported on the post.

7. The cleaning device according to claim 6, wherein the pendulum drive has a pneumatic motor supported on the post or a servomotor, by which the pinion can be rotated.

8. The cleaning device according to claim 7, wherein the advancing unit comprises a tube guide, that is interrupted in the region of the drive.

9. The cleaning device according to claim 1, wherein the advancing unit has a pinion by which the advancing unit can be rotated about the main axis (H).

10. The cleaning device according to claim 1, wherein a controller is connected to the pendulum drive and the drive.

11. The cleaning device according to claim 1, wherein the pendulum drive has a rack-and-pinion transmission, wherein the rack-and-pinion transmission has the pinion and a rack that can be moved back and forth on the post, and wherein a linear movement of the rack is converted into a rotation of the pinion and thus of the advancing unit by the rack-and-pinion transmission.

12. The cleaning device according to claim 11, wherein the rack can be moved linearly using two single-acting lift cylinders or using a double-acting lift cylinder, wherein the lift cylinder(s) are supported on the post.

13. The cleaning device according to claim 1, wherein the pendulum drive has a pneumatic motor supported on the post or a servomotor, by which the pinion can be rotated.

14. The cleaning device according to claim 1, wherein the advancing unit comprises a tube guide, that is interrupted in the region of the drive.

* * * * *